US 6,708,799 B1

(12) United States Patent
Yaczkanich

(10) Patent No.: US 6,708,799 B1
(45) Date of Patent: Mar. 23, 2004

(54) ALL-TERRAIN VEHICLE LADDER SUPPORT BRACKET

(76) Inventor: Charles M. Yaczkanich, 5 Naomi St., Fayette City, PA (US) 15438-1007

( * ) Notice: Subject to any disclaimer, the term of this patent is extended or adjusted under 35 U.S.C. 154(b) by 0 days.

(21) Appl. No.: 10/166,961

(22) Filed: Jun. 11, 2002

(51) Int. Cl.[7] .............................. E06C 5/00; E04G 1/00
(52) U.S. Cl. ...................................... 182/127; 182/129
(58) Field of Search ................................. 182/127, 129, 182/106, 230; 224/310, 405, 552, 42.42, 42.1 F, 42.38; 248/503, 226, 201; 211/182, 13, 195; 280/4, 32.5, 481

(56) References Cited

U.S. PATENT DOCUMENTS

| 615,721 | A | | 12/1898 | Lane | |
|---|---|---|---|---|---|
| 4,696,374 | A | | 9/1987 | Hale | |
| 4,751,981 | A | * | 6/1988 | Mitchell et al. | 182/127 |
| 5,236,062 | A | | 8/1993 | Laney | |
| 5,297,844 | A | | 3/1994 | Haustein | |
| 5,398,778 | A | * | 3/1995 | Sexton | 182/127 |
| 5,642,844 | A | | 7/1997 | Rector | |
| 5,651,484 | A | * | 7/1997 | Fugman | 182/127 X |
| 5,850,891 | A | * | 12/1998 | Olms et al. | 182/127 |
| 5,863,173 | A | | 1/1999 | Bremner | |
| 5,881,839 | A | | 3/1999 | Stanley | |
| 6,012,545 | A | | 1/2000 | Faleide | |
| 6,086,031 | A | | 7/2000 | Renfro | |
| 6,105,721 | A | * | 8/2000 | Haynes | 182/127 |
| 6,290,023 | B1 | | 9/2001 | Martin | |
| 6,345,691 | B1 | | 2/2002 | Ruiz | |

* cited by examiner

Primary Examiner—Hugh B. Thompson, II
(74) Attorney, Agent, or Firm—John D. Gugliotta; P. Jeff Martin

(57) ABSTRACT

An all-terrain vehicle ladder support bracket is provided. The support bracket includes a pair of tubular frame assemblies adapted for removable attachment to a traditional all-terrain vehicle to serve as a ladder support. Each tubular frame assembly has a main leg member with a curved, lower end which threadedly receives a V-shaped extension member. Attachment of the V-shaped extension member provides a horizontally disposed impingement surface for impinging against an aluminum ladder. The V-shaped extension member is available in a plurality of sizes having various lengths, thereby allowing for the all-terrain vehicle ladder support bracket to accommodate a load capacity of at least two aluminum ladders. An upper arm member extends perpendicularly from the main leg member and bifurcates into two laterally opposed retainment arms which serve to anchor the support bracket. The aluminum ladder is supported laterally alongside the all-terrain vehicle.

10 Claims, 5 Drawing Sheets

ALL-TERRAIN VEHICLE LADDER SUPPORT BRACKET

RELATED APPLICATIONS

The present invention was first described in Disclosure Document No. 508,665 filed on Mar. 22, 2002. There are no previously filed, nor currently any co-pending applications, anywhere in the world.

BACKGROUND OF THE INVENTION

1. Field of the Invention

The present invention relates generally to removable devices or accessories for all-terrain vehicles and, more particularly, to an all-terrain vehicle ladder support bracket.

2. Description of the Related Art

The use of all-terrain vehicles or "ATVs" has reached an all time high among adolescents as well as adults. While the initial intent of such vehicles was for recreational use, hunters early on recognized that ATVs could be extremely advantageous for traveling into remote, off-road areas where game is typically found. For instance, ATVs greatly decreased the work of having to drag game out of such remote regions.

Also, many hunters take advantage of elevated devices such as tree stands for providing an extended view of the field below as well as to be out of game's sight. However, while the utility of ATVs for trekking to an fro remote hunting areas has been quickly recognized and enjoyed, standard ATVs have not provided for or been capable of aiding the hunter in transporting climbing aids and similar equipment for ascending into tree stands.

Accordingly, a need has arisen for a removably attachable device for an ATV which supports a traditional aluminum ladder. The development of the all-terrain vehicle ladder support bracket fulfills this need.

A search of the prior art did not disclose any patents that read directly on the claims of the instant invention; however, the following references were considered related.

U.S. Pat. No. 5,297,844 issued in the name of Haustein discloses a cab and hunting stand being attachable to and easily removable from the front and rear racks of an ATV.

U.S. Pat. No. 4,696,374 issued in the name of Hale discloses a portable hunting stand adapted to be retrofitted to a three wheeled motorcycle, ATV or the like.

U.S. Pat. No. 615,721 issued in the name of Lane discloses a basket which has a lower portion comprising a section of frame which is provided with a protective covering being spark preventative.

U.S. Pat. No. 5,236,062 issued in the name of Laney describes a support rack adapted for mounting to an all-terrain vehicle framework.

U.S. Pat. No. 5,863,173 issued in the name of Bremner describes a vehicular deck attachment and assembly.

U.S. Pat. No. 6,012,545 issued in the name of Faleide discloses a foldable vehicle ladder system for allowing a user to easily view and access the interior portion of a truck box and other equipment.

U.S. Pat. No. 5,642,844 issued in the name of Rector describes a tree stand carrier for an ATV.

U.S. Pat. No. 6,290,023 B1 issued in the name of Martin discloses a system and apparatus for converting a trailer to an observation stand.

U.S. Pat. No. 5,881,839 issued in the name of Stanley discloses a hunter's stand for securement to the bed of a pick-up truck.

U.S. Pat. No. 6,345,691 B1 issued in the name of Ruiz describes a ladder latch system for securing telescoping ladders in the retracted position.

U.S. Pat. No. 6,086,031 issued in the name of Renfro describes a gun and beverage support system for supporting a weapon and a beverage while the hunter is sitting or standing within a tree stand.

Consequently, a need has been felt for providing a removably attachable device for an ATV which supports a traditional aluminum ladder in a manner which is quick, easy, and efficient.

SUMMARY OF THE INVENTION

Therefore, it is an object of the present invention to provide an attachable ladder support bracket for a standard ATV for supporting a traditional aluminum ladder.

It is another object of the present invention to provide a ladder support bracket designed to be removably attached to both a front and rear ATV horizontal frame member as are associated with a traditional ATV.

It is another object of the present invention to provide a ladder support bracket fabricated of cold rolled, hollow steel tubing.

It is another object of the present invention to provide a main leg member with a curved, lower end which forms a threaded cusp.

It is another object of the present invention to provide V-shaped extension member with a lower end defining complementary threads for threadedly engaging the threaded cusp.

It is another object of the present invention to provide a V-shaped extension member which is available in a plurality of sizes having various lengths.

It is another object of the present invention to provide an upper arm member which extends perpendicularly from the main leg member and bifurcates into two laterally opposed retainment arms.

It is another object of the present invention to provide retainment arms which are mechanically impinged against cross members of the front and rear ATV horizontal frame members.

It is another object of the present invention to provide a support bracket designed so as to accommodate at least two aluminum ladders.

It is still another object of the present invention to provide a ladder support bracket designed and configured so as to rest in an angular plane which allows for total ATV tire clearance when tires are facing forward as well as when turned.

Briefly described according to one embodiment of the present invention, an all-terrain vehicle ladder support bracket is provided. The support bracket includes a pair of tubular frame assemblies adapted for removable attachment to a traditional all-terrain vehicle (ATV) to serve as a ladder support means. More specifically, the present invention is designed and configured to be removably attached to both a front and a rear ATV horizontal frame member as are associated with a traditional ATV.

Each tubular frame assembly comprises a main leg member of a generally elongated configuration, fabricated of cold rolled, hollow steel tubing. The main leg member includes a curved, lower end forming a threaded cusp which is designed to threadedly receive a V-shaped extension member.

The V-shaped extension member is fabricated of cold rolled, hollow steel tubing and has a lower end defining complementary threads for threadedly engaging the threaded cusp. The V-shaped extension member is available in a plurality of sizes comprising various lengths, thereby allowing for the all-terrain vehicle ladder support bracket to accommodate a load capacity of at least two aluminum ladders.

The tubular frame assembly further includes an upper arm member which extends perpendicularly from the main leg member and bifurcates into two laterally opposed retainment arms in a perpendicular manner so as to generally form a T-shaped member.

The function and method of attachment of the present invention to a traditional ATV is described briefly hereinbelow.

Retainment arms of the upper arm member are directed orthogonally below inner cross members of front ATV horizontal frame member, wherein retainment arms mechanically impinge against inner cross members. The main leg member rests against a vertical member of the front ATV horizontal frame member. Once a desired V-shaped extension member has been selected and threadedly attached to the threaded cusp, a horizontally disposed impingement surface is created for impinging against an aluminum ladder, while the main leg member serves as a firm base upon which forward sidewalls of vertical legs aluminum ladder can be supported, thereby securably supporting the ladder in a restrained manner for transport.

The aforementioned procedure regarding temporary attachment of the all-terrain vehicle ladder support bracket to the front ATV horizontal frame member is applied in the same manner with respect to temporary attachment of the all-terrain vehicle ladder support bracket to the rear ATV horizontal frame member.

The rear ATV horizontal frame member defines a generally rectangularly-shaped support member which has a plurality of cross members integrally connected therebetween. The cross members function as brace members in the same respect as inner cross members of the front ATV horizontal frame member function.

The use of the present invention allows a standard ATV to be adapted to support a traditional aluminum ladder in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
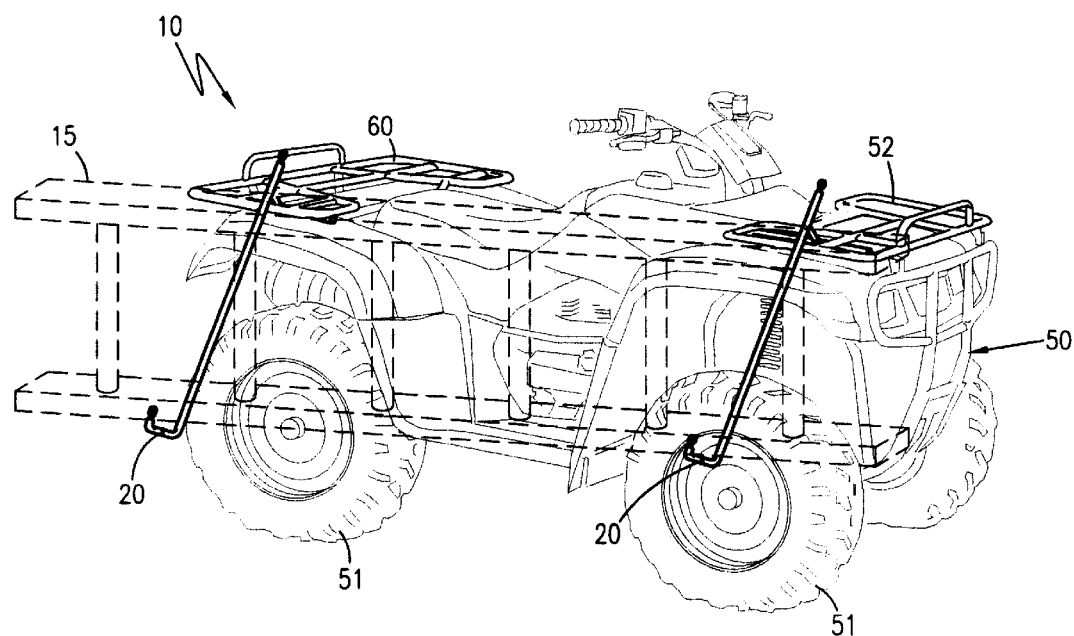
FIG. 1 is a perspective view of an all-terrain vehicle ladder support bracket according to the preferred embodiment of the present invention shown attached to an ATV and supporting an aluminum ladder.
Figure 2:
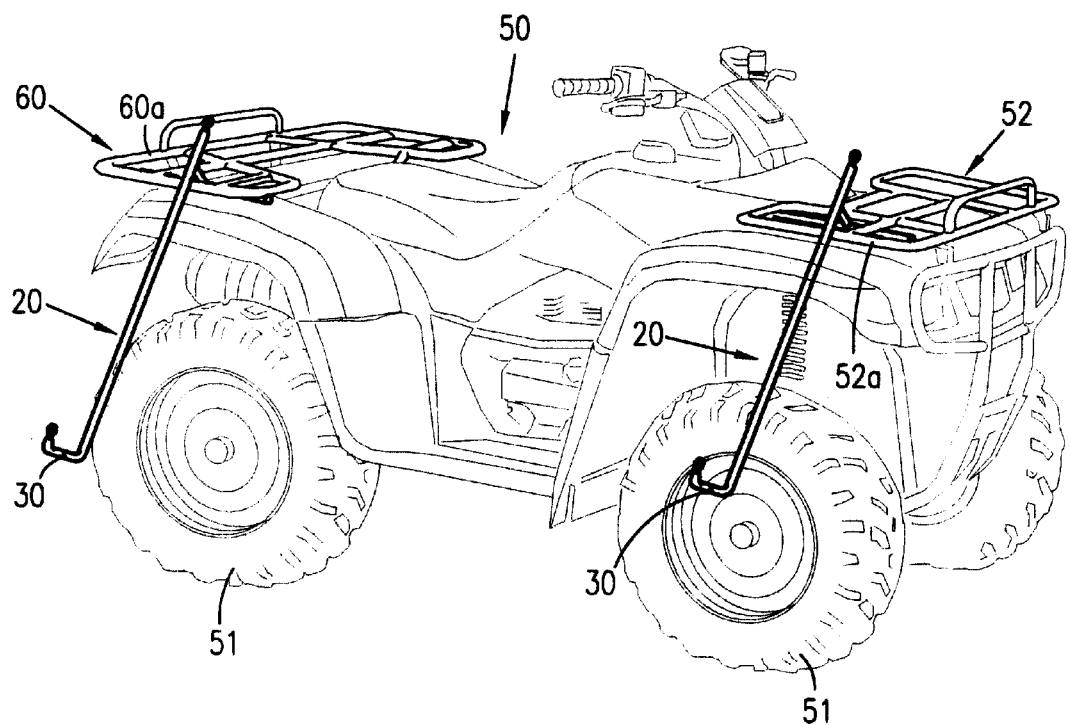
FIG. 2 is a perspective view of the present invention according to the preferred embodiment shown attached to an ATV.
Figure 3:
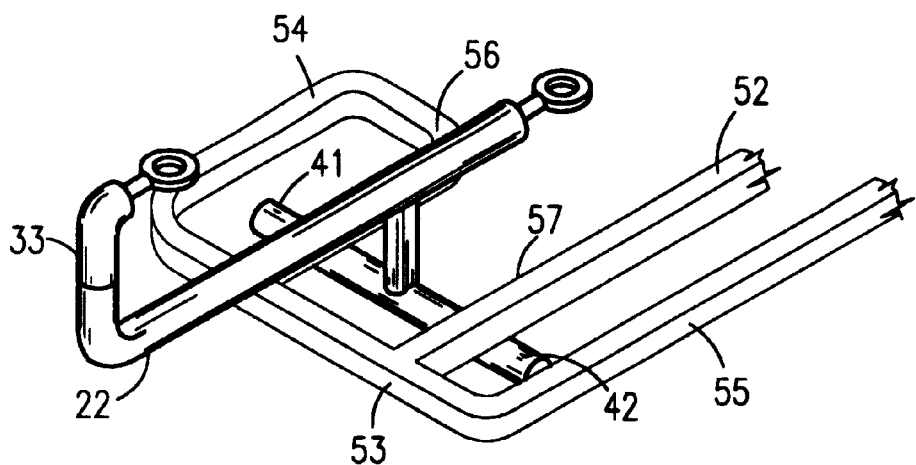
FIG. 3 is a side elevational view of the present invention shown attached to a front ATV horizontal frame member according to the preferred embodiment of the present invention.
Figure 4:
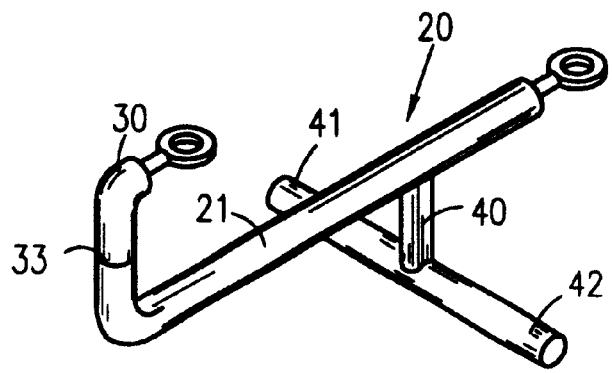
FIG. 4 is a side elevational view of the tubular frame assembly.
Figure 5:
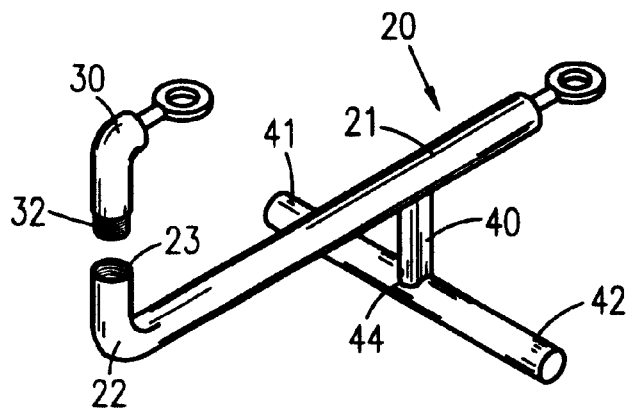
FIG. 5 is an exploded perspective view of the tubular frame assembly.
Figure 6:
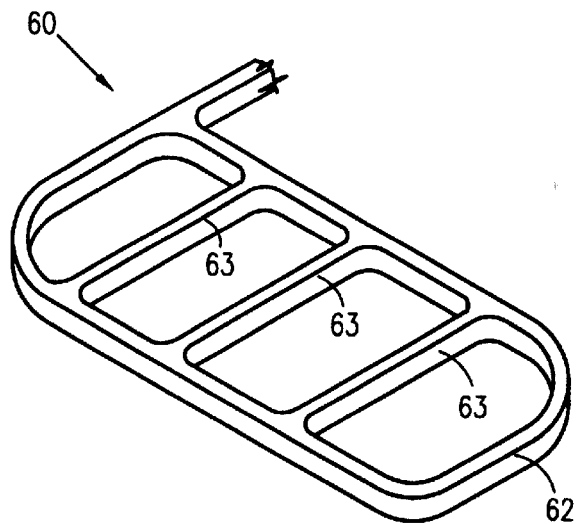
FIG. 6 is a partial top plan view of the rear ATV horizontal frame member.
Figure 7:
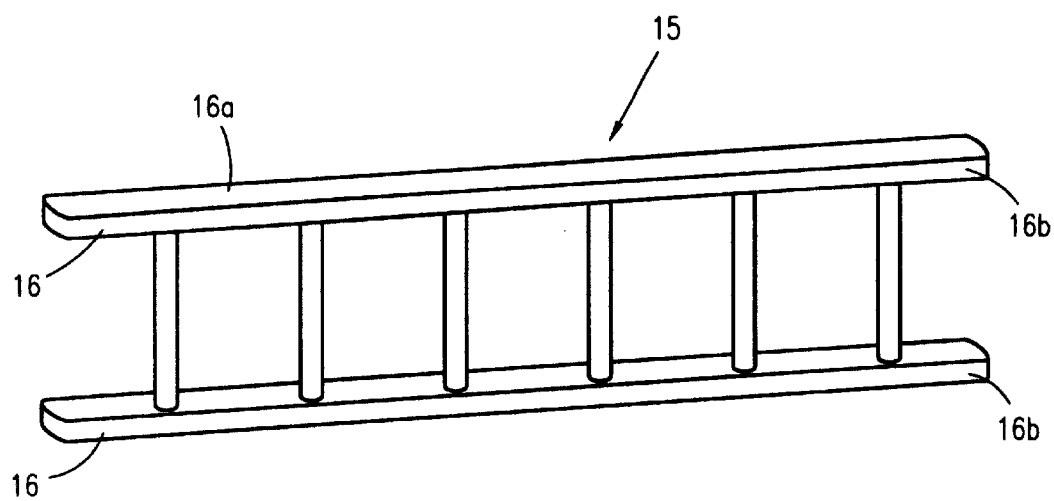
FIG. 7 is a perspective view of a traditional aluminum ladder.
Figure 8:
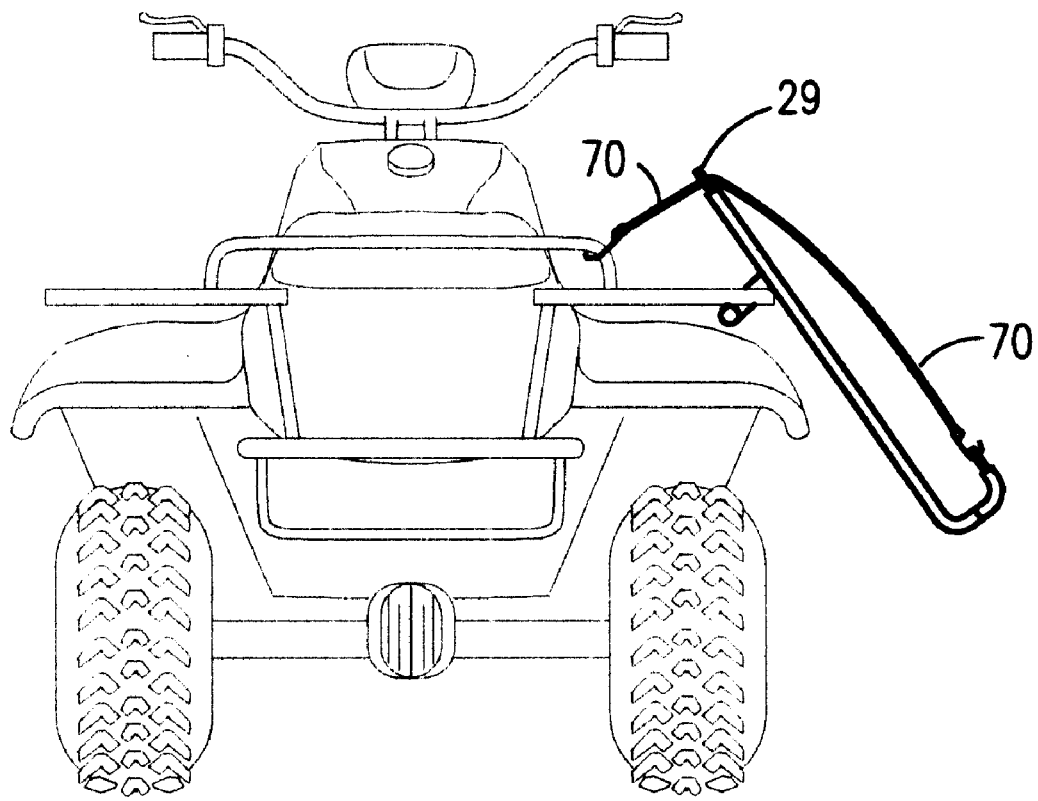
FIG. 8 is a perspective view of the present invention illustrating attachment of the present invention to an ATV shown from a rear side thereof.

Referring now to FIGS. 1–8, an all-terrain vehicle ladder support bracket 10 is shown, according to the present invention, comprised of a pair of tubular frame assemblies 20 adapted for removable attachment to a traditional all-terrain vehicle (ATV) 50 to serve as a ladder support means. More specifically, the present invention is designed and configured to be removably attached to both a front and rear ATV horizontal frame member 52, 60, respectfully as are associated with a traditional ATV 50. For purposes of this disclosure, each of the pair of tubular frame assemblies 20 are identical, and as such, only a single tubular frame assembly 20 is described henceforth.

The tubular frame assembly 20 comprises a main leg member 21 of a generally elongated configuration, fabricated of cold rolled, hollow steel tubing. It is envisioned that the main leg member 21 may also be fabricated of a rigid, resilient plastic material of high strength capable of readily supporting a traditional aluminum ladder 15; however, steel is the preferred fabrication material. The main leg member 21 includes a curved, lower end 22 forming a threaded cusp 23 which is designed so as to threadedly receive a V-shaped extension member 30. An upper end 24 of the main leg member 21 includes an eye 29 affixed in an upright manner to an uppermost extremity thereof. The eye 29 provides a receiving loop for attaching a securement strap 70, such as a bungee strap, thereto.

The V-shaped extension member 30 is fabricated of cold rolled, hollow steel tubing and has a lower end defining complementary threads 32 for threadedly engaging the threaded cusp 23. The V-shaped extension member 30 includes an upper end having an eye 29 affixed in an upright manner to an uppermost extremity thereof so as to facilitate removable attachment of a securement strap 70 thereto.

The V-shaped extension member 30 is available in a plurality of sizes comprising various lengths, thereby allowing for the all-terrain vehicle ladder support bracket 10 to accommodate a load capacity of at least two aluminum ladders 15.

Alternatively, it is envisioned that the V-shaped extension member 30 can be extended away from or retracted into the curved, lower end 22 of the main leg member 21 telescopically. As such, the length of the V-shaped extension member 30 is mechanically adjustable, thereby providing various linear lengths, and further being held into a desired position via a spring-loaded pin assembly. However, the preferred method for linear extension and attachment of the V-shaped extension member 30 to the threaded cusp 23 is via threaded engagement as described hereinabove.

The tubular frame assembly 20 further includes an upper arm member 40 extending perpendicularly from the main leg member 21 in a direction opposite to threaded cusp 23. The upper arm member 40 bifurcates into two laterally opposed retainment arms 41, 42 in a perpendicular manner so as to generally form a T-shaped member 44.

In order to best describe the function of the retainment arms 41, 42 and main leg member 21, a brief description of the front and rear ATV horizontal frame member 52, 60 is required. The front ATV horizontal frame member 52 defines a first portion 52a comprising a vertical member 53 connected integrally by a first outer cross member 54 and a second outer cross member 55. A first inner cross member 56 and a second inner cross member 57, functioning as brace members, integrally connect to the vertical member 53. Retainment arms 41, 42 of the upper arm member 40 are directed orthogonally below first inner cross member 56 and second inner cross member 57 of front ATV horizontal frame member 52, wherein an upper circumferential surface of retainment arms 41, 42 mechanically impinge against a lower circumferential surface of inner cross members 56, 57. A rear, external circumferential sidewall of main leg member 21, just below upper arm member 40, rests against an upper surface of vertical member 53 of the front ATV horizontal frame member 52. Once a desired V-shaped extension member 30 has been selected and threadedly attached to the threaded cusp 23, a horizontally disposed impingement surface 33 is created for impinging against a lateral sidewall 16a of a vertical leg 16 of an aluminum ladder 15, while the main leg member 21 serves as a firm base upon which forward sidewalls 16b of vertical legs 16 of aluminum ladder 15 can be supported, thereby securably supporting the ladder 15 in a restrained manner for transport.

When attached for use, the all-terrain vehicle ladder support bracket 10 is designed and configured so as to rest in an angular plane which allows for total tire 51 clearance when tires 51 are facing forward as well as when turned.

The rear ATV horizontal frame member 60 defines a first portion 60a having a generally rectangularly-shaped support member 62. The support member 62 has a plurality of cross members 63 integrally connected therebetween. The cross members 63 function as brace members in the same respect as first inner cross member 56 and second inner cross member 57.

The aforementioned procedure regarding temporary attachment of the all-terrain vehicle ladder support bracket 10 to the front ATV horizontal frame member 52 is applied in the same manner with respect to temporary attachment of the all-terrain vehicle ladder support bracket 10 to the rear ATV horizontal frame member 60.

It should be noted that outer cross member 54 and second outer cross member 55 of the front ATV horizontal frame member 52 in addition to any chosen cross member 63 of rear ATV horizontal frame member 60 may be utilized as a brace member against which retainment arms 41, 42 are mechanically impinged.

It is envisioned that the all-terrain vehicle ladder support bracket 10 can also be utilized for supporting lumber, fence posts, and other similar, elongated construction materials capable of being safely supported by the present invention. Thus, use of the all-terrain vehicle ladder support bracket 10 is not intended to be limited solely for the support and transport of ladders.

It is further envisioned that alternatively, the all-terrain vehicle ladder support bracket 10 may be permanently mounted via welding, bolting, or clamping to the front and rear ATV horizontal frame members 52, 60. Welding, however, would be the preferred method for permanent attachment for this modified form of the invention. As bolts require holes, this method of attachment would leave surfaces exposed thereby being more susceptible to rust.

2. Operation of the Preferred Embodiment

To use the present invention, user selects a desired V-shaped extension member 30 and attaches it to the threaded cusp 23. User then orthogonally directs retainment arms 41, 42 of the upper arm member 40 below inner cross member 56 and inner cross member 57 of front ATV horizontal frame member 52 such that the upper circumferential surface of retainment arms 41, 42 mechanically impinges against a lower circumferential surface of inner cross members 56, 57. User allows the rear, external circumferential sidewall of main leg member 21 to rest against the upper surface of vertical member 53 of the front ATV horizontal frame member 52. Finally, user places the lateral sidewall 16a of the vertical leg 16 of the aluminum ladder 15 against the horizontally disposed impingement surface 33, and rests the forward sidewalls 16b of the vertical legs 16 of aluminum ladder 15 against the main leg member 21, thereby securably supporting the ladder 15 in a restrained manner for transport.

The use of the present invention allows a standard ATV to be adapted to support a traditional aluminum ladder 15 in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An all-terrain vehicle ladder support bracket comprising:

a pair of tubular frame assemblies, said pair of tubular frame assemblies are adapted for removable attachment to a traditional all-terrain vehicle to serve as a ladder support means, and wherein each tubular frame assembly of said pair of tubular frame assemblies are designed and configured identical;

each frame assembly of said pair of tubular frame assemblies having a main leg member, said main leg member is of a generally elongated configuration, fabricated of cold rolled, hollow steel tubing, wherein said main leg member serves as a firm base upon which forward sidewalls of vertical legs of an aluminum ladder is supported, wherein said main leg member includes a curved, lower end forming a threaded cusp, said threaded cusp is designed so as to threadedly receive a V-shaped extension member, said V-shaped extension member is fabricated of cold rolled, hollow steel tubing, and wherein said main leg member further includes an upper end having an eye affixed in an upright manner to an uppermost extremity of said upper end, and wherein said eye provides a receiving loop for removable attachment of a securement strap;

an upper arm member said upper arm member extends from said main leg member; and a horizontally disposed impingement surface said horizontally disposed impingement surface is formed by threaded attachment of said V-shaped extension member to said threaded cusp.

2. The all-terrain vehicle ladder support bracket of claim 1, wherein said V-shaped extension member has a lower end defining complementary threads for threadedly engaging said threaded cusp, and wherein said V-shaped extension member further having an upper end with an eye affixed in an upright manner to an uppermost extremity of said upper end, and wherein said eye provides a receiving loop for removable attachment of a securement strap.

3. The all-terrain vehicle ladder support bracket of claim 1, wherein said upper arm member extends perpendicularly from said main leg member in a direction opposite to said threaded cusp, said upper arm member bifurcates into two laterally opposed retainment arms in a perpendicular manner so as to generally form a T-shaped member.

4. The all-terrain vehicle ladder support bracket of claim 3, wherein said laterally opposed retainment arms are directed orthogonally below a first inner cross member and a second inner cross member of a front all-terrain vehicle horizontal frame member of the traditional all-terrain vehicle, and wherein an upper circumferential surface of each of said laterally opposed retainment arms mechanically impinge against a lower circumferential surface of the first inner cross member and the second inner cross member.

5. The all-terrain vehicle ladder support bracket of claim 3, wherein said laterally opposed retainment arms are directed orthogonally below a plurality of cross members of a rear all-terrain vehicle horizontal frame member, said cross members functioning as brace members, and wherein an upper circumferential surface of each of said laterally opposed retainment arms mechanically impinge against a lower circumferential surface of said plurality of cross members.

6. The all-terrain vehicle ladder support bracket of claim 1, wherein said horizontally disposed impingement surface is formed upon threaded attachment of said V-shaped extension member to said threaded cusp of said curved, lower end of said main leg member, and said horizontally disposed impingement surface impinges against a lateral sidewall of a vertical leg of the aluminum ladder.

7. The all-terrain vehicle ladder support bracket of claim 1, wherein said main leg member having a rear, external circumferential sidewall which rests against an upper surface of a vertical member of the front all-terrain vehicle horizontal frame member.

8. The all-terrain vehicle ladder support bracket of claim 1, wherein said main leg member having a rear, external circumferential sidewall which rests against an upper surface of a generally rectangularly-shaped support member of said rear all-terrain vehicle horizontal frame member.

9. The all-terrain vehicle ladder support bracket of claim 1, wherein said pair of tubular frame assemblies are designed and configured so as to rest in an angular plane which allows for total tire clearance when a tire is facing forward as well as when the tire is turned, after attachment of said pair of tubular frame assemblies to said traditional all-terrain vehicle.

10. An all-terrain vehicle ladder support bracket comprising:

a pair of tubular frame assemblies, said pair of tubular frame assemblies are adapted for removable attachment to a traditional all-terrain vehicle to serve as a ladder support means, and wherein each tubular frame assembly of said pair of tubular frame assemblies are designed and configured identical;

each frame assembly of said pair of tubular frame assemblies having a main leg member, said main leg member is of a generally elongated configuration, fabricated of cold rolled, hollow steel tubing, said main leg member includes a curved, lower end adapted to telescopically receive a V-shaped extension member, said V-shaped extension member is fabricated of cold rolled, hollow steel tubing and is available in a plurality of sizes comprising various lengths, thereby allowing for said all-terrain vehicle ladder support bracket to accommodate a load capacity being greater than one of the aluminum ladder, wherein said main leg member further includes an upper end having an eye affixed in an upright manner to an uppermost extremity of said upper end, said eye provides a receiving loop for removable attachment of a securement strap, and wherein said main leg member serves as a firm base upon which forward sidewalls of vertical legs of aluminum ladder is supported.

an upper arm member said upper arm member extends from said main leg member; and a horizontally disposed impingement surface said horizontally disposed impingement surface is formed by telescopic reception of said V-shaped extension member by said curved, lower end of said main leg member.

* * * * *